US011503027B2

(12) United States Patent
Zayats et al.

(10) Patent No.: US 11,503,027 B2
(45) Date of Patent: Nov. 15, 2022

(54) VALIDATING CONFIGURATION CHANGES ON A NETWORK DEVICE

(71) Applicant: HEWLETT PACKARD ENTERPRISE DEVELOPMENT LP, Houston, TX (US)

(72) Inventors: Michael Zayats, Santa Clara, CA (US); Sagar Bhanagay, Santa Clara, CA (US); Hitesh Padekar, Santa Clara, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 576 days.

(21) Appl. No.: 16/197,533

(22) Filed: Nov. 21, 2018

(65) Prior Publication Data

US 2020/0162462 A1    May 21, 2020

(51) Int. Cl.
*H04L 29/06* (2006.01)
*H04L 9/40* (2022.01)
*G06F 16/23* (2019.01)
*H04L 41/0869* (2022.01)
*H04L 41/0853* (2022.01)
*H04L 41/0859* (2022.01)
*G06F 21/62* (2013.01)

(52) U.S. Cl.
CPC .......... *H04L 63/10* (2013.01); *G06F 16/2379* (2019.01); *G06F 21/6218* (2013.01); *H04L 41/0853* (2013.01); *H04L 41/0863* (2013.01); *H04L 41/0869* (2013.01)

(58) Field of Classification Search
CPC . H04L 63/10; H04L 41/0869; H04L 41/0853; H04L 41/0863; G06F 16/2379; G06F 21/6218
USPC .......................................................... 726/4
See application file for complete search history.

(56) References Cited

U.S. PATENT DOCUMENTS 6,477,683 B1 * 11/2002 Killian ...................... G06F 8/41
716/106
6,665,714 B1 * 12/2003 Blumenau ............... H04L 29/06
709/222
7,171,410 B1 * 1/2007 Neufeld .............. G06F 11/1438
709/220

(Continued)

*Primary Examiner* — Michael W Chao
*Assistant Examiner* — Peiliang Pan
(74) *Attorney, Agent, or Firm* — Nolte Intellectual Property Law Group

(57) ABSTRACT

A technique to manage a configuration database (CDB) for a network device is disclosed. Network devices may receive a configuration change request as a configuration change object. To process that request, a current configuration CLI set representative of the current CDB may be generated. The network device creates a shadow CDB initially corresponding to the current CDB and processes the change request against the shadow CDB. An updated configuration CLI set may then be generated from the updated shadow CDB. A differential CLI set indicating the difference between the first CLI set and the second CLI set may be generated to represent a set of CLI commands to transition from one CDB to the other (e.g., implement the request). Authorization of the user to execute the CLI commands of the differential CLI dataset may be verified. Upon verification, the current CDB may be replaced with the updated shadow CDB.

16 Claims, 11 Drawing Sheets

(56) References Cited

U.S. PATENT DOCUMENTS

| | | | |
|---|---|---|---|
| 7,565,416 B1* | 7/2009 | Shafer | H04L 41/0813 |
| | | | 709/203 |
| 7,865,578 B1* | 1/2011 | Gerraty | H04L 12/40013 |
| | | | 709/220 |
| 7,958,347 B1* | 6/2011 | Ferguson | H04L 9/321 |
| | | | 713/155 |
| 8,583,769 B1* | 11/2013 | Peters | H04L 12/42 |
| | | | 709/221 |
| 10,382,266 B1* | 8/2019 | Balakrishnan | H04L 61/2007 |
| 10,474,825 B1* | 11/2019 | Gupta | G06F 9/4406 |
| 2003/0005273 A1* | 1/2003 | Perycz | H04L 41/0856 |
| | | | 713/1 |
| 2004/0158621 A1* | 8/2004 | Reyna | G06F 8/30 |
| | | | 709/220 |
| 2005/0229152 A1* | 10/2005 | Connell | G06F 8/10 |
| | | | 717/104 |
| 2006/0036723 A1* | 2/2006 | Yip | H04L 67/327 |
| | | | 709/223 |
| 2013/0028106 A1* | 1/2013 | Frost | H04L 41/0893 |
| | | | 370/252 |
| 2013/0051316 A1* | 2/2013 | Bhatt | H04W 92/20 |
| | | | 370/328 |
| 2015/0092604 A1* | 4/2015 | Bevemyr | H04L 41/0226 |
| | | | 370/254 |
| 2015/0193464 A1* | 7/2015 | Kwon | G06F 16/1815 |
| | | | 707/648 |
| 2018/0006877 A1* | 1/2018 | Raman | H04L 41/22 |
| 2018/0285211 A1* | 10/2018 | Eberhard | G06F 11/202 |

* cited by examiner

VALIDATING CONFIGURATION CHANGES ON A NETWORK DEVICE

BACKGROUND

Networks of computers that support business activities are often composed of a multitude of network devices. These network devices may cooperate, for example, by combining several physically different networking technologies, to appear virtually as a unitary, cohesive system. Certain network devices may also provide infrastructure for controlling the flow of data to ensure secure and efficient network operation. Data flow between network-aware applications and services may be "invisibly" facilitated, in part, by network devices. Examples of such network devices may include but are not limited to: load-balancers, routers, switches, and firewalls. Network devices critical to a network's infrastructure may be deployed with redundancy, for example, to prevent a single point of failure in the network. A redundancy, for example, may mean that multiple network devices are deployed where at least one is active and at least one is in a "hot stand-by" mode, ready to take over should the primary device fail. Sometimes, a single network device may act as a standby (or backup) for more than one primary device.

Failures of critical networking devices are not limited to functional failure due to hardware and may also experience a software error or malfunction because of a failed configuration setting. Any network, regardless of complexity or size, may need maintenance and configuration changes as the networking needs for the entity operating the network evolve. Updates to configuration may include incorporating new networking devices, linking new networks to the existing network, or even simply removing devices that are obsolete. Configuration changes to existing network devices are one aspect of this maintenance, and the changes are often applied to a multitude of devices nearly instantaneously (e.g., a single configuration change may impact multiple network communication devices). These configuration changes to network devices, if done improperly, may inadvertently cause a network failure.

BRIEF DESCRIPTION OF THE DRAWINGS

The present disclosure may be better understood from the following detailed description when read with the accompanying Figures. It is emphasized that, in accordance with standard practice in the industry, various features are not drawn to scale. In fact, the dimensions or locations of functional attributes may be relocated or combined based on design, security, performance, or other factors known in the art of computer systems. Further, order of processing may be altered for some functions, both internally and with respect to each other. That is, some functions may not require serial processing and therefore may be performed in an order different than shown or possibly in parallel with each other. For a detailed description of various examples, reference will now be made to the accompanying drawings, in which.

DETAILED DESCRIPTION

Figure 1A:
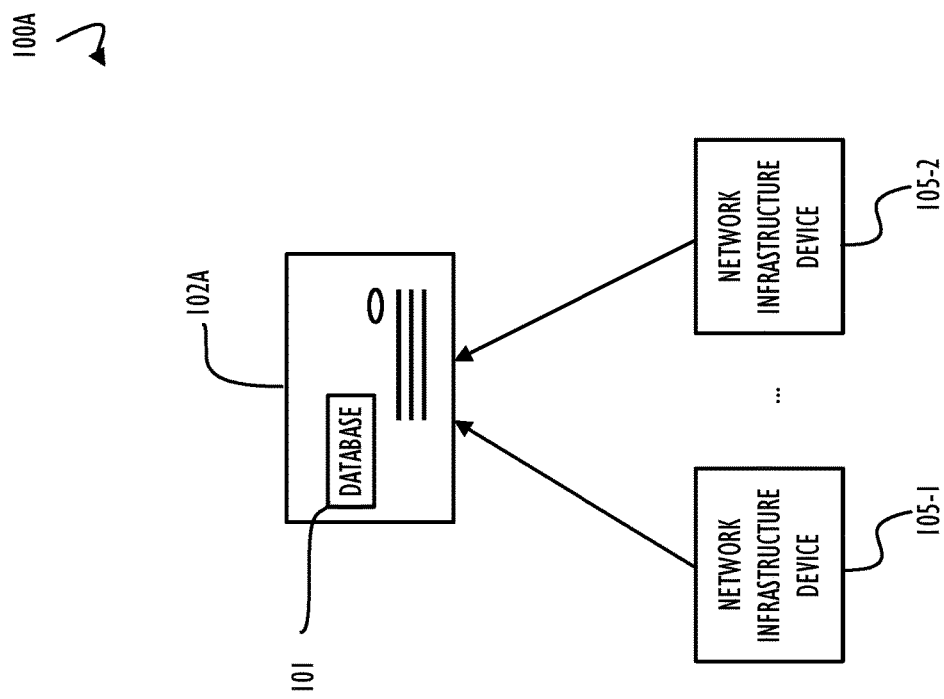
FIG. 1A is a block diagram of an example network system including multiple network infrastructure devices and a centralized configuration database server, according to one or more disclosed implementations.

Examples of the subject matter claimed below will now be disclosed. In the interest of clarity, not all features of an actual implementation are described for every example implementation in this specification. It will be appreciated that in the development of any such actual example, numerous implementation-specific decisions may be made to achieve the developer's specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

Networks of computers that support business activities are often composed of a multitude of infrastructure devices. These infrastructure devices may provide, for example, a method of combining several physically different networking technologies to appear virtually as one cohesive network. The infrastructure devices may also provide methods of controlling the flow of data to ensure the network operates securely and efficiently. Data flow between network-aware applications and services may be "invisibly" facilitated by these network infrastructure devices. Examples of network infrastructure devices may include but are not limited to load-balancers, routers, switches, and firewalls. These infrastructure devices may be special-purpose computing devices or they may be general purpose computing devices configured to operate as a network infrastructure device. These infrastructure devices may be critical to network operations and infrastructure devices supporting network communications may be referred to as simply, "network infrastructure devices."

Configurations of network infrastructure devices may be stored locally on each device or in a centralized database containing information for multiple devices. Multiple network infrastructure devices, acting as clients to this centralized database, may access this database to obtain operational configuration data. This operational configuration data may be utilized, for example, to dictate how the network infrastructure device functions. In other examples, the configuration information in the centralized database may be utilized to validate configurations before being committed to change how the infrastructure device functions. In yet another example, a copy of the configuration information in the centralized database may be treated as a "checkpoint" or "snapshot" of the configuration data used to quickly recover a known-good state of a functional network configuration (e.g., perform a roll-back to a known good configuration). The concept of a checkpoint or snapshot in this context, is to make a substantially complete copy of the centralized configuration database and retain that copy for an indeterminate amount of time. For example, a number of previous states of configuration may be maintained or a previous state may be stored for a period of time prior to considering the current state as a "known good state." The concept and use of the "checkpoint" or "snapshot" are well known to those skilled in the art and therefore further discussion of the use of these concepts is beyond the scope of this disclosure. In short, checkpoints or snapshots may be complete copies or delta copies of previous configurations and implemented via local storage on each device, a central configuration repository, or a combination of these techniques.

There are many different use cases where the disclosed techniques for creating a shadow database may be utilized to implement an improvement to the art of network administration and improve the overall functioning of a computer network. Specifically, one use case may involve a "dry-run" or testing of a proposed configuration change. For example, a network infrastructure device may be supporting a critical network infrastructure so testing a change may be implemented using a shadow database technique rather than altering the actual run-time production configuration. That is, a customer may want to try out a configuration, such as adding a new configuration setting, before actually deploying that configuration. Accordingly, by testing the configuration change on a shadow copy that is not actually providing run-time information to the network infrastructure device, if something unforeseen were to occur during the test, the system may not be severely impacted (or may not be impacted at all). In other words, by creating a shadow database instance which initially, i.e., prior to any modification, is a copy of the original, the shadow database can be used to do the validation rather than a production version of the database. The network configuration database described herein may contain attributes of the device itself and the hardware of the device, along with network attributes that are needed for the network infrastructure device to perform its function (including access control lists (ACLs) which may be large in size). Creation of the shadow database instance may be performed on demand, for example, whenever a performance checkpoint is desired, or a validation process is to be performed.

To summarize a possible work flow, a network switch may be up and running to control a network. A system administrator may cause transmission of a configuration change request object (e.g., bundle of configuration changes) to the device to perform an administrative action (or validate that the administration action may be performed without unexpected authorization failures). For example, it may be problematic if a configuration change object included both authorized and un-authorized changes as part of an object based change request bundle. After receipt of a bundle (e.g., JSON object), a shadow database instance may be requested and used to validate a set of CLI commands that may be used to alter the shadow instance to perform the dry-run test. As part of testing these changes against a shadow database, nothing is being written to the run-time production database (because changes are localized to the shadow instance). After the test is complete, the system administrator may simply shut down their test (and possibly disconnect from the shadow database). The system administrator may, based on the results of the test, subsequently attach to a production database instance to apply their already validated changes to the production side rather than the test side. In this manner, shadow database instances may be used to perform validation of a proposed configuration change to a network infrastructure device.

In another example, to implement configuration changes in a network infrastructure device, a user may issue configuration change requests to the network infrastructure device. A network system may be provided with an authentication, authorization, and accounting (AAA) mechanism to prevent unauthorized changes from being made to network device configurations (See FIG. 1D).

Whereas it has traditionally been common for configuration change requests to be issued to a network device via a command line interface (CLI), it is becoming increasingly more common for network devices to be accessed via other interfaces, An AAA mechanism adapted to process configuration change requests in the form of CLI commands may not be able to properly process configuration change requests embodied in other formats.

To address the potential inability of an AAA mechanism to properly process configuration changes not requested in the form of CLI commands, a methodology may be provided whereby a differential CLI command set corresponding to configuration changes requested in a configuration change request object is generated. The differential CLI command set may be processed through the AAA mechanism by serially sending each command in the CLI command set to allow for proper authorization and accounting of the requested changes.

In networking systems, authentication, authorization, and accounting (AAA) refers to a mechanism for controlling user access to network devices and other computing resources, enforcing access and other policies, and auditing usage, for example, to provide the information necessary to bill for services or to audit who may a change to the configuration and when that change was implemented. The combined processes encompassed by an AAA mechanism may be considered important for effective network management and security.

A command line interface (CLI) has often been provided as the user interface for facilitating user access to a network infrastructure device and thereby enabling the user to implement configuration changes in a network infrastructure device. With a CLI, the user at a network location such as a network-connected computer or workstation is presented with a command prompt on a user display. At the command prompt, a user may issue commands that are sent to the network device. A CLI has a predefined set of commands ("CLI command set") consisting of the possible commands a user can issue across the CLI interface to perform desired functions on the network device, such as to implement changes to the configuration of the network device.

In a network implementation, AAA mechanisms may be implemented locally on individual network devices, by an AAA server coupled to the network, or by a combination of local and remote AAA server functionality. When a user wishes to initiate an access session with a network device, for example, to issue commands for effectuating changes to the configuration of the network device, the user is first authenticated. Authentication requires the user to provide necessary information, such as a user name and a password, via the user interface. An AAA agent executing locally on the network infrastructure device can either perform user authentication locally, or the AAA agent of the network device can forward the user authentication information to an AAA server for the purposes of authenticating the user.

As part of the user authentication process, an AAA mechanism may assign the user to a user-group. Each user-group may have an associated privilege level (e.g., 1-15). The user-group privilege level may determine which commands in the CLI command set a user is authorized to issue. For example, higher-priority users may be authorized to issue more CLI commands than lower-priority users.

Once a user is authenticated for a session with a network infrastructure device and the user's privilege level has been determined, the user is granted access and can issue configuration change requests to effectuate changes to the configuration of the network device via the user interface. In the case of a CLI with a network device, a user requests configuration changes by issuing CLI commands transmitted to the network device via, for example, a Secure Shell (SSH) protocol. Each time a user issues a CLI command, the AAA mechanism (local, remote, or a combination thereof) for the network infrastructure device may determine whether the user is authorized to issue the particular command, based on the user's assigned priority. If the AAA mechanism indicates that the user is authorized to issue the command, the network infrastructure device will process the command. As commands are processed, the AAA mechanism will perform accounting functions such as logging the types of commands the user issues, recording the amount of system time or amount of data a user has sent or received during a session. This information may be used for authorization control (i.e., security), billing, trend analysis, resource utilization and optimization, and network maintenance, including capacity planning activities.

AAA mechanisms, whether provided locally by a network infrastructure device or by a network-connected AAA server, may be implemented in the form of an AAA application executed for performing these functions. A current standard by which AAA mechanisms may be implemented the Remote Authentication Dial-In User Service, or "RADIUS" protocol. Another standard is the Terminal Access Controller Access-Control System Plus, or "TACACS+" protocol. RADIUS or TACACS+ servers are examples of network resources which implement AAA mechanisms for a network.

As networking technologies have evolved, there have been changes in the methodologies in which some network functions are implemented, including the mechanisms and protocols for communication between network resources. For example, whereas a CLI has traditionally been used for providing user access to network infrastructure devices, other methodologies may provide additional flexibility. Specifically, a REST-compliant ("RESTful") service, in accordance with disclosed techniques, may be used to enable access and manipulation of network devices using a uniform and predefined set of stateless operations. For example, the disclosed change request object may be implemented using a REST Application Program Interface (API) and represent an improvement to the art of network administration.

In some cases, user interfaces other than CLIs, may not be as compatible with the authorization and accounting components of AAA mechanisms. With a CLI interface, each command is typically issued one at a time via the user interface and is processed by the AAA mechanism as described above. With other interfaces, such as those which are browser-based, users may communicate with network devices using different formats. For example, for a browser-based REST-compliant interface configured in accordance with disclosed techniques, JavaScript Object Notation (JSON) data objects embodied in secure hypertext transport protocol (HTTPS) requests may be communicated to a network infrastructure device. Such data objects may identify a plurality of related changes (e.g., changes that belong together) or set of individual configuration changes (e.g., sent together for convenience) the administrator wishes to effectuate on the network device. However, these bundles of requested configuration changes may not be initially provided to the network infrastructure device as individual CLI commands that may be expected by an AAA mechanism. Consequently, CLI-based AAA mechanisms may not be able to understand a bundle of commands. Accordingly, disclosed techniques may split out the bundle to allow existing AAA mechanisms to work with the enhanced change request techniques disclosed herein.

In a conventional network implementation, a network switch is one type of network infrastructure device that maintains a configuration database containing various configuration parameters for the network infrastructure device itself as well as for devices that may be connected to the network infrastructure device. A network infrastructure device such as a switch may be configured as a client of an AAA server, such as a TACACS+ or RADIUS server, for implementing AAA functions for the network infrastructure device. Alternatively, or in addition to an AAA server, a network device may implement a local AAA mechanism. A combination of AAA mechanisms (e.g., local and remote) may also be used.

A configuration database maintained by a network infrastructure device such as a switch may also be defined by a CLI set. That is, there may exist a set of CLI commands, that when executed, would create a copy of the configuration database. Disclosed techniques may utilize this attribute to generate one or more CLI sets that "mirror" the contents of a configuration database. In this context, the term "mirror" means that execution of the CLI set would, in essence, create an exact copy (e.g., snapshot) of the database from which the CLI set was generated.

Having an understanding of the above overview, this disclosure will now explain a non-limiting but detailed example implementation. This example implementation is explained with reference to the figures that include: a set of functional block diagrams showing multiple network infrastructure devices (e.g., switch/router) (FIGS. 1A-D); a functional block diagram illustrating creating a shadow copy of the configuration database on demand (FIG. 2); an alternate implementation where a multi-client configuration uses a shared local configuration database (FIG. 3); a transaction event timeline illustrating one possible process flow and device interaction (FIG. 4); a flow chart illustrating a network infrastructure device utilizing a shadow copy of the configuration database to validate a change request (FIG. 5); an example processor and computer-readable medium to implement an infrastructure device utilizing a shadow copy of the configuration database (FIG. 6); a computer network infrastructure that may be used to implement all or part of the disclosed technique for utilizing a shadow copy of a configuration database (FIG. 7); and an example processing device that may be used in one or more devices that may implement the disclosed techniques for utilizing a shadow copy of the configuration database (FIG. 8).

Referring to FIG. 1A, an example block diagram 100A illustrates a centralized configuration database 101 containing configuration data for or more network infrastructure devices. As illustrated, configuration database 101 may be stored on a device 102A accessible to a plurality of remote network infrastructure devices 105-1 and 105-2. Device 102A may be a network infrastructure device or may simply be a computer device configured to provide a database service. Devices that may be considered a network infrastructure device may include load-balancers, routers, switches, firewalls, or other network connected devices that may provide services required for controlling data flow across a network. Some network infrastructure devices may provide a combination of functions provided by other network infrastructure devices. In FIG. 1A, block diagram 100A illustrates a plurality of network infrastructure devices 105 that refer to centralized configuration database 101. Block diagram 100A represents a depiction of a single centralized database 100 and is not intended to limit all implementations of the central configuration database to a single instance of the database. Techniques may be employed to create a central configuration database that has no single point of failure to prevent network failure in the event of a device hosting the central configuration database fails. These techniques are understood with respect to making a critical resource highly available. Any high availability techniques may be used in conjunction with disclosed implementations, but for simplicity, may not be specifically discussed when explaining the examples in this disclosure.

Figure 1B:
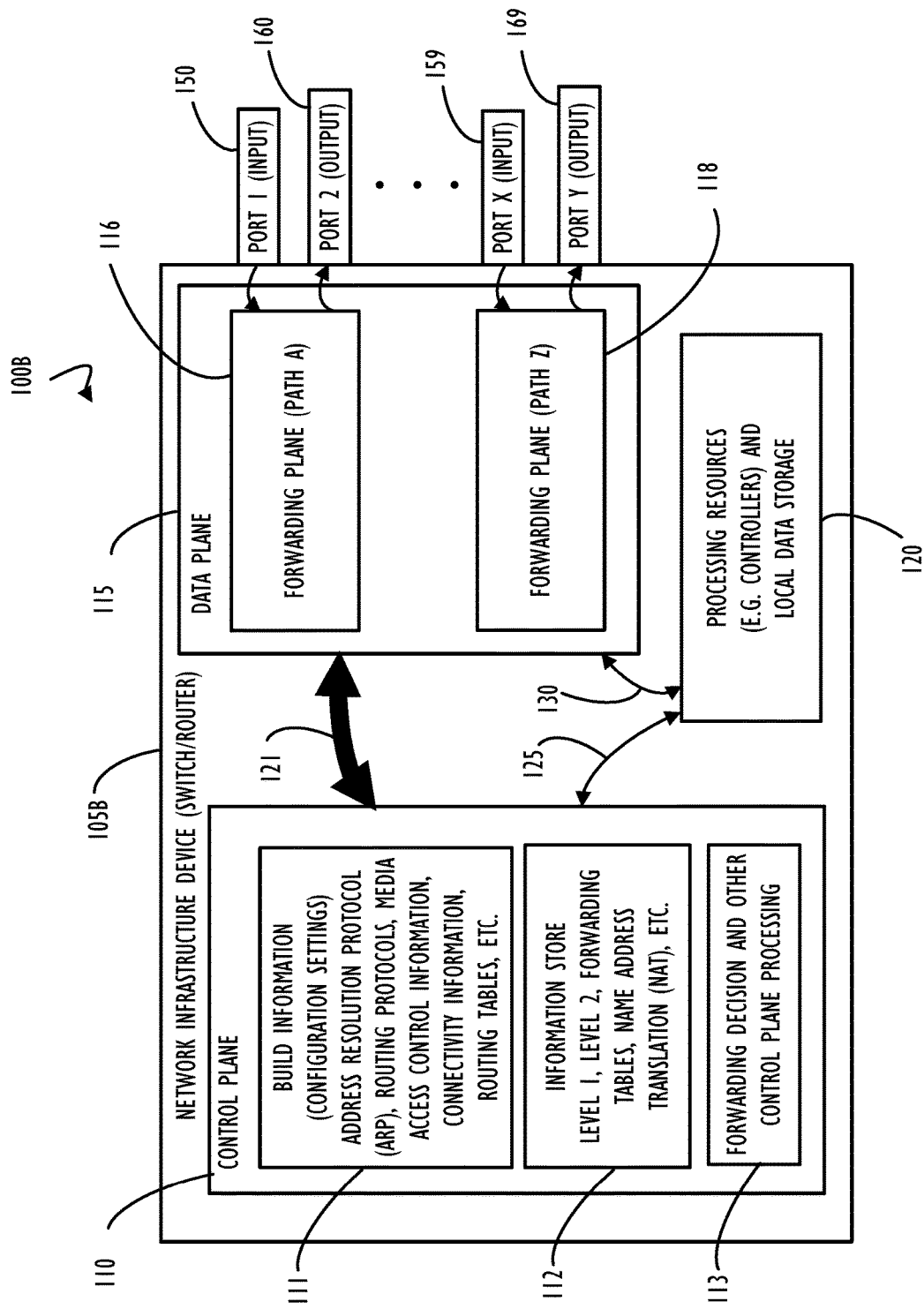
FIG. 1B is a is a block diagram representing functional modules and functional components of a switch/router as an example of a network infrastructure device, according to one or more disclosed implementations.

Referring now to FIG. 1B, a network infrastructure device such as a switch/router 105B is illustrated as an example in block diagram 100B. In general, a router has two types of network element components organized onto separate planes illustrated as control plane 110 and data plane 115. In addition, a typical switch/router 105B may include processing resources and local data storage 120. Depending on the capabilities of a particular switch/router 105B different types of processing resources and local storage may be present. In general, higher capacity router/switch 105B implementations will include substantial processing resources and memory while simpler (e.g., low capacity) devices will contain less internal resources.

Control plane 110, for example in a router, may be used to maintain routing tables (or a single comprehensive routing table) that list which route should be used to forward a data packet, and through which physical interface connection (e.g., output ports 160 through 169). Control plane 110 may perform this function by using internal preconfigured directives, called static routes, or by learning routes dynamically using a routing protocol. Static and dynamic routes may be stored in one or more of the routing tables. The control-plane logic may then strip non-essential directives from the table and build a forwarding information base (FIB) to be used by data plane 115. Although ports in this example are illustrated as input or output, in practice ports are generally used for both input and output.

A router may also use a forwarding plane 116 (e.g., part of the data plane 115) that contains different forwarding paths for information from different ports or different destination addresses (e.g., forwarding path A shown in forwarding plane 116 or forwarding path Z shown in forwarding plane 118). In general, The router forwards data packets between incoming (e.g., ports 150 through 159) and outgoing interface connections (e.g., ports 160 through 169). The router forwards data packets to the correct network type using information that the packet header contains matched to entries in the FIB supplied by control plane 110. Ports are typically bidirectional and are shown in this example as either "input" or "output" to illustrate flow of a message through a routing path. In some network implementations, a router (e.g., network infrastructure device switch/router 105B) may have interfaces for different types of physical layer connections, such as copper cables, fiber optic, or wireless transmission. A single router may also support different network layer transmission standards. Each network interface may be used to enable data packets to be forwarded from one transmission system to another. Routers may also be used to connect two or more logical groups of computer devices known as subnets, each with a different network prefix.

Also illustrated in FIG. 1B, bidirectional arrow 121 indicates that control plane 110 and data plane 115 may work in a coordinated fashion to achieve the overall capabilities of network infrastructure device switch/router 105B. Similarly, bidirectional arrow 125 indicates that processing and local data storage resources 120 may interface with control plane 110 to provide processing and storage support for capabilities assigned to control plane 110. Bidirectional arrow 130 indicates that processing and local data storage resources 120 may also interface with data plane 115 as necessary.

Control plane 110, as illustrated in FIG. 1B, includes several example functional control blocks. Additional control blocks are possible depending on the capabilities of a particular implementation of a network infrastructure device. Block 111 indicates that control plane 110 may have associated build information regarding a software version of control code that is currently executing on infrastructure network device switch/router 105B. In addition, that software version may include configuration settings to determine how network infrastructure device switch/router 105B and its associated control code perform different functions.

Many different configuration settings for both the software and the device itself are possible and describing each is beyond the scope of this disclosure. However, the disclosed database shadow techniques may be designed to identify configuration settings designated for validation/ testing. Block 111 indicates that routing information and connectivity information may be known to network device 105B and may be made available to control plane 110 or data plane 115 (e.g., via path 121 or as part of processing via paths 125 and 130). Block 112 similarly indicates that an information store may be accessible from control plane 110 and include forwarding tables or NAT information as appropriate. Block 113 indicates that control plan 110 may also be aware of forwarding decisions and other processing information. Although FIG. 1B illustrates these logical capabilities within control plan 110 they may actually be implemented outside of, but accessible to, control plane 110.

Figure 1C:
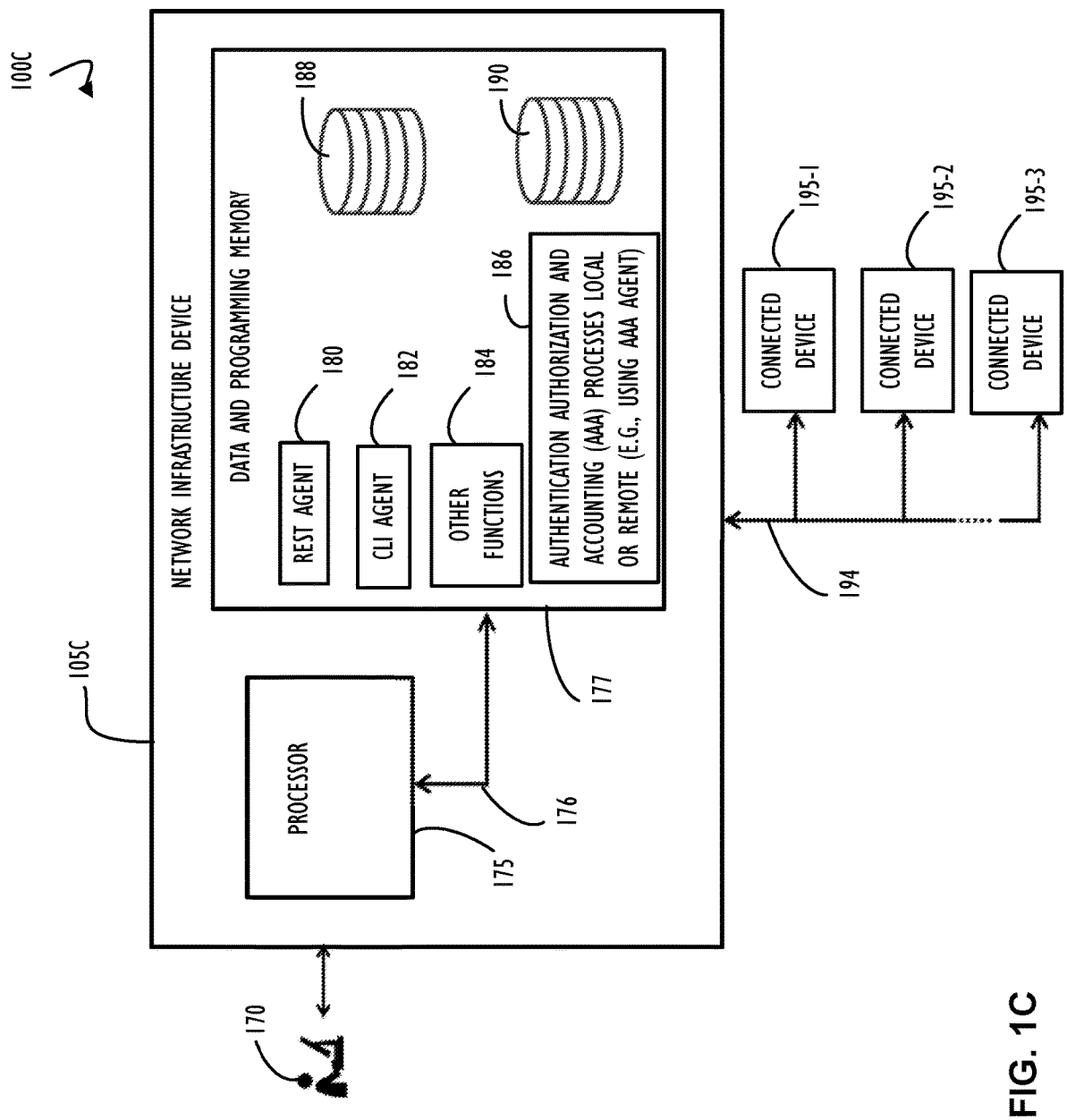
FIG. 1C is a block diagram representing a network infrastructure device and its possible interaction with a user and other connected devices, according to one or more disclosed implementations.

FIG. 1C illustrates a block diagram of an example network system 100 including a network infrastructure device 105C. In this example, network infrastructure device 105C may be a network switch. A plurality of other connected devices 195-1, 195-2, . . . 195-n (collectively, "connected devices 195"), which may be of various and different types, are coupled to network device 105C via a network connection 194. (Although a single connection 194 is shown in FIG. 1C between network device 105C and connected devices 195, actual implementations may involve separate connections between connected devices 195 and network device 105C, including wired (e.g., Ethernet) connections, wireless connections, and so on, depending upon the nature of network infrastructure device 105C and the nature and function of the various connected devices 195.

As shown in FIG. 1, network infrastructure device 105C may include a processor 175 for implementing the functionality of network device 105C as described herein through execution of program code. Network infrastructure device 105C may therefore also incorporate data and programming memory 177. Although data and programming memory 177 is represented by a single block in FIG. 1C, and a single connection 176 is illustrated between processor 175 and data and programming memory 177, it will be understood that data and programming memory 177 may comprise a combination of different storage modalities, including volatile and non-volatile semiconductor memory units, mass data storage units such as hard disk drives and the like, read-only memory (ROM) for basic operations of processor 175, and so on. Connection 176 may therefore include more than one logical or physical connection between processor 175 and data and programming memory 177. For example, processor 175 may access an area of ROM for its basic operation, random-access memory (RAM), such as DRAM and the like, for storing executable code and/or data, and/or mass storage devices such as hard drives and the like also for storing executable and/or data.

For example, as represented by different blocks inside data and programming memory 177 that is coupled to processor 175 there may be separate programming (executable code) for enabling functionality of network infrastructure device 105C as a CLI agent 182, i.e., allowing network infrastructure device 105C to process CLI commands and perform other CLI-related functions. Similarly, data and programming memory 177 may store executable code for enabling functionality of network device 105C as an agent adapted to another communication protocol, for example, a REST agent 180, i.e., allowing network device 105C to communicate via a REST protocol, including the processing of JSON objects (or other formats of change request objects).

Although some examples of this disclosure describe a REST-complaint user interface and the use of JSON data objects over the REST interface, these are only intended as illustrative examples. Other network device interface protocols, involving other data formats, may be employed in different implementations without departing from the scope of this disclosure.

Also, in the example of FIG. 1C, data and programming memory 177 may store executable code comprising a local authentication, authorization, and accounting (AAA) process 186 for providing AAA functionality in the operation of network device 105C. Further, data and programming memory 177 may store executable code for implementing other network device functions 184 as are described herein. Also, portions of data and programming memory 177 may be used for storing a configuration database 188 and, at times, a shadow configuration database 190, as hereinafter described.

With continued reference to FIG. 1, a user 170 using an end-user device may access network infrastructure device 105C via a network connection. User 170 may be a remote user, such as a network administrator, and a network connection may be provided in various forms, including network connections such as Internet connections, cellular connections, and the like.

In one example, user 170 communicates with network device 105C using a REST interface, and in which JSON-formatted packets are incorporated into secure hypertext transfer protocol (HTTPS) requests transmitted over a network connection to network device 105C. For this purpose, REST agent 180 may be invoked to process JSON-formatted packets. Because, JSON packets may not include CLI commands and may instead contain a bundle of change requests, the mechanism for processing such requests may not be directly subjected to the authentication, authorization, and accounting functionality of an AAA server (e.g., AAA server 197 of FIG. 1D discussed below). As noted above, if an interface other than a REST interface is implemented, a corresponding interface agent, analogous to REST agent 180 of this example, may be implemented.

In the example of FIG. 1C, CLI agent 182 implements a CLI set-generating code function to traverse a configuration database, such as configuration database 188, and to generate a configuration database CLI set corresponding to the configuration data stored in the configuration database. The configuration database CLI set resulting from execution of CLI set-generating code function of CLI agent 182 may produce a collection of CLI commands that when executed by a network infrastructure device generates the specific configuration of the configuration database traversed to generate the configuration database CLI set. In some CLI-based network systems, a configuration database CLI set may be determined, in part, by executing a "show running configuration" CLI command issued locally on a network infrastructure device.

Figure 1D:
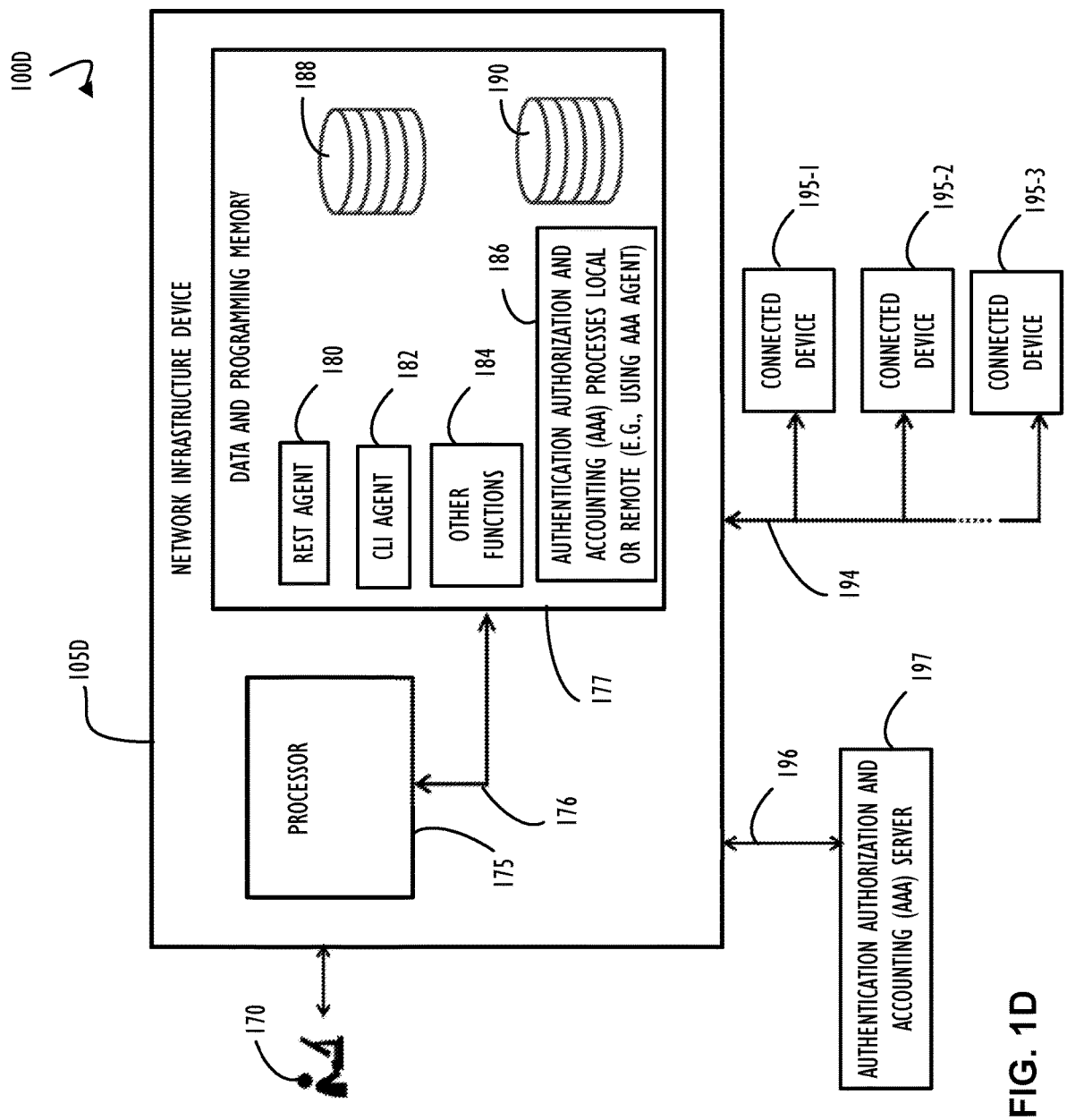
FIG. 1D is a block diagram representing an authentication, authorization, and accounting (AAA) server added to the example of FIG. 1C, according to one or more disclosed implementations.

FIG. 1D is a block diagram of another example network system 100D. Network system 100D includes many of the same elements as network system 100C from FIG. 1C, and such elements retain identical reference numerals in both FIGS. 1C and 1D.

In the example of FIG. 1D, a remote authentication, authorization, and accounting (AAA) server 197 is coupled to network infrastructure device 105D via a connection 196, which may be network connection, a serial port connection, or some other type of communication interface. In this example, executable code 186 implementing an AAA agent process is stored in data and programming memory 177. In this example, AAA functionality is achieved, at least in part, remotely through cooperation of AAA agent process 186 and AAA server 197.

Figure 2:
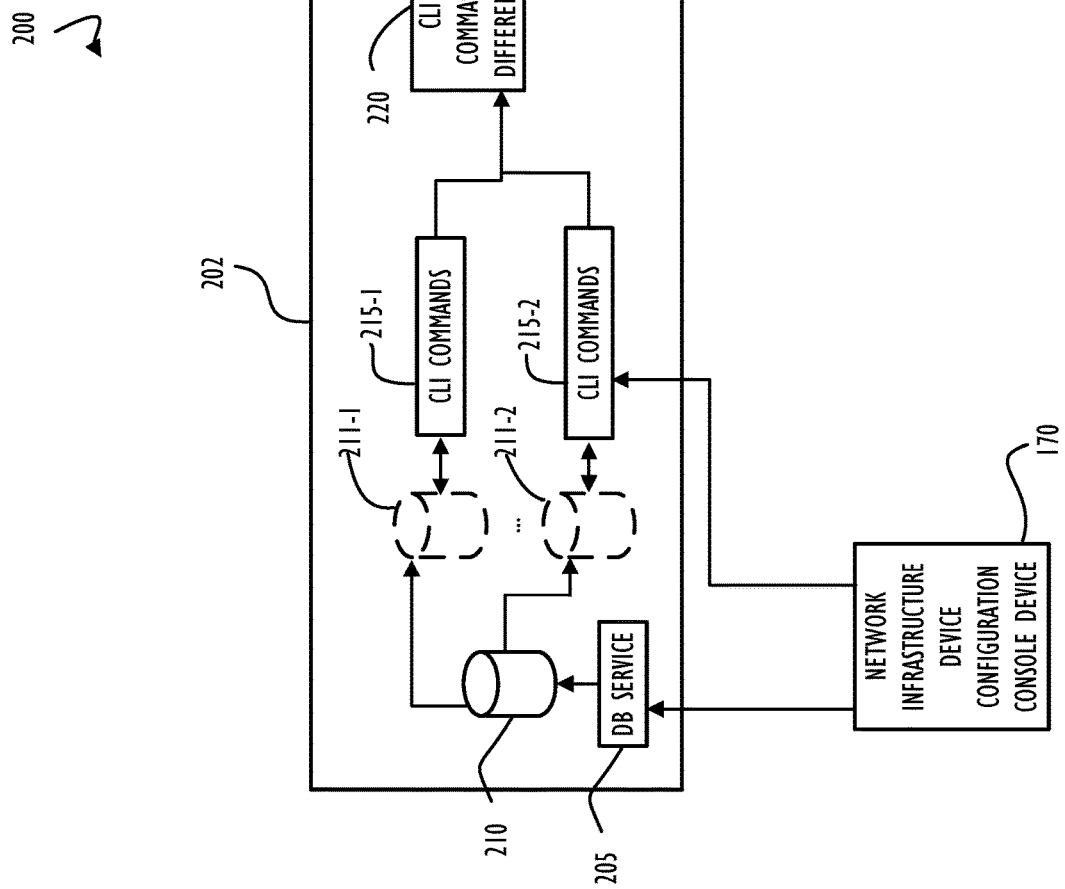
FIG. 2 is a block diagram representing a network device (or other database processing device) containing a configuration database and possible processing steps for a configuration change request, according to one or more disclosed implementations.

Referring now to FIG. 2, an example of a network infrastructure device configuration console device 170 (e.g., an example of the user interface device 170 of FIGS. 1A-D) interfacing with a configuration database service mechanism 202. In this example configuration database service mechanism 202 includes a DB service 205 interfacing with a configuration database 210. Configuration database service mechanism 202 includes storage and processing for one or more instances of a configuration database. This example depicts a primary data access service as DB service 205 that may mediate access to primary configuration data base 210 and initiate creation and execution of one or more shadow databases 211-1 and 211-2 in addition to primary configuration database 210. Additionally, each instance of a configuration database may be associated with a CLI commands 215-1 and 215-2 (e.g. the generated CLI command sets discussed above). Further, based on a comparison of different CLI command sets a CLI commands differential 220 may be created. As discussed herein, this CLI commands differential represents a subset of CLI commands provide in each of the other CLI command sets and represents a delta between the compared databases.

Figure 3:
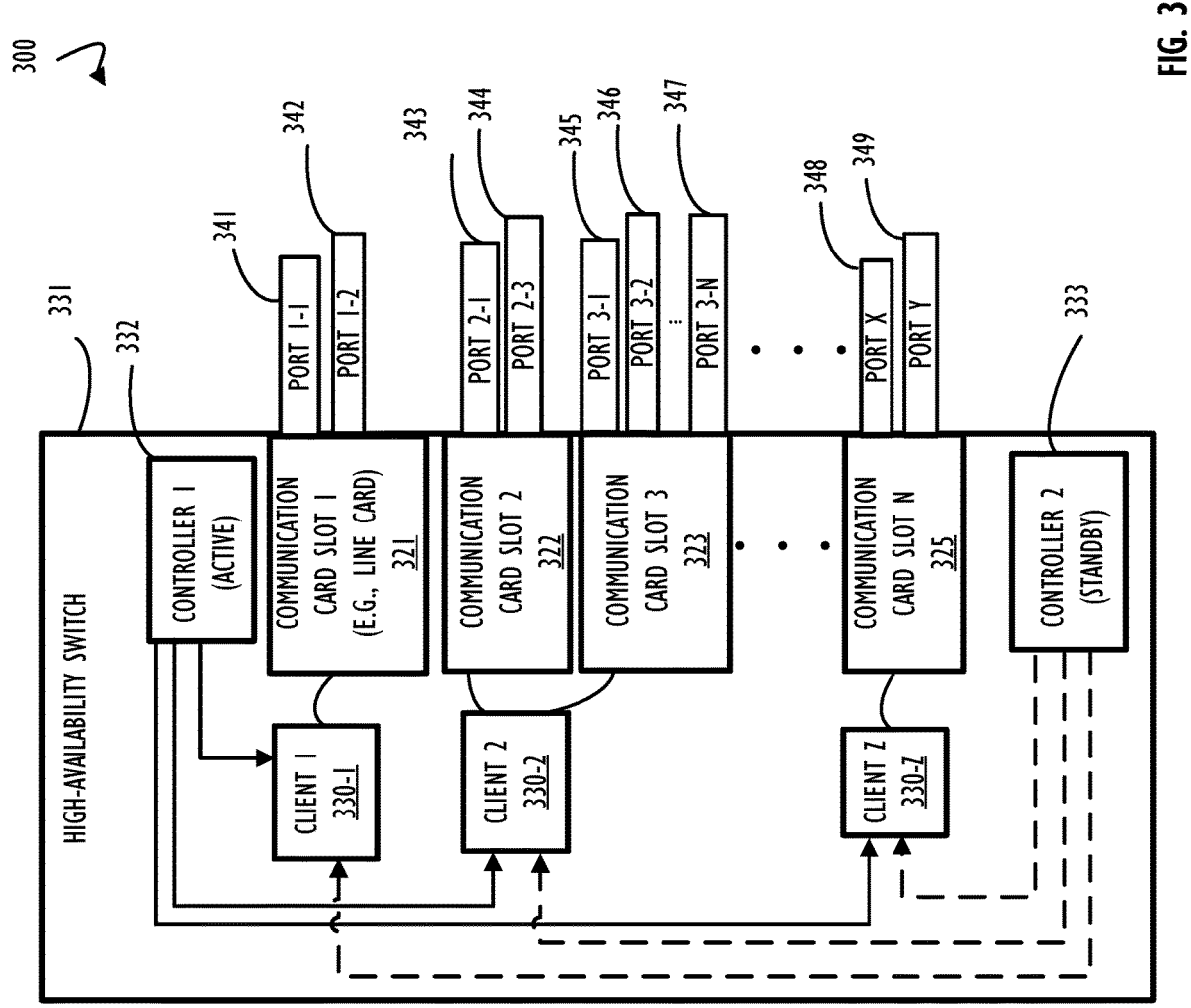
FIG. 3 is a function block diagram illustrating multiple client applications, executing locally on a single network infrastructure device, accessing a central configuration database (where the configuration database is central to a single device), according to one or more disclosed implementations.

Referring now to FIG. 3, an example of a high-availability switch 331 is illustrated in block diagram 300. High-availability switch 331 is illustrated with two controllers. Controller 1 (332) is identified as the "active" controller and Controller 2 (333) is identified as the "standby" controller. As explained in more detail below, a high-availability switch, such as high-availability switch 331, may have any number of controllers and typically has at least two. In some configurations, the controllers work as a primary/backup pair with a dedicated active controller and a dedicated standby controller. In a primary/backup configuration, the primary performs all network functions and the standby, as its name suggests, waits to become the active if a failover condition is reached. Failover may be automatic or manual and will be discussed in more detail below. In general, failover at a high level refers to the active and standby switching roles so that the standby becomes the active and the active (typically after restarting) becomes the standby.

High-availability switch 331 also includes a plurality of communication cards (e.g., Card Slot 1 (321), Card Slot 2 (322), Card Slot 3 (323), and Card Slot N (325)) that may each have a plurality of communication ports configured to support network communication. A card slot, such as Card Slot 1 (321) may also be referred to as a "line card" and have a plurality of bi-directional communication ports (as well as a management port (not shown)). Card Slot 1 (321) is illustrated with port 1-1 (341) and port 1-2 (342) and may represent a "card" that is plugged into a slot (e.g., communication bus connection) of a backplane (e.g., communication bus) of high-availability switch 331. Other connections and connection types are also possible (e.g., cable connection). Also, in FIG. 2B, Card Slot 2 (322) is illustrated with port 2-1 (343) and port 2-2 (344); Card Slot 3 (323) is illustrated with ports 3-1 (345), 3-2 (346), and port 3-N (347); and Card Slot N (325) is illustrated with port X (348) and port Y (349).

To support communications between a controller (e.g., an active and/or a standby controller) in a switch and client devices connected to that switch, a number of communication client applications may be executing on a given switch. Client applications executing on a switch may assist in both: communication to connected clients, and configuration of hardware on the switch (e.g., ports of a line card). In some cases, client applications are referred to as "listeners," in part, because they "listen" for a communication or command and then process what they receive. Alternatively, or in addition, processes interacting with a data base may be called "publishers" and "subscribers," where subscribers receive information and publishers provide updates (e.g., writes) to information. Further, these client applications represent client applications that may request access to a shadow copy of a configuration database as discussed above. For high-availability switch 331, an example client application is client 1 (330-1) which is illustrated to support communication from either the active or the standby controller to devices connected through Card Slot 1 (321).

A second example client application in FIG. 3 is client 2 (330-2) which is illustrated to support communication from either controller to both of Card Slot 2 (322) and Card Slot 3 (323). Finally, client Z (330-Z) is illustrated to support communication from both controllers to Card Slot N (325). Dashed lines in block diagram 300 from standby controller 2 to client applications indicate that the standby controller may be communicatively coupled to a communication card slot via a client application but may not be transmitting significant data because of its standby status. Solid lines in block diagram 300 from active controller 1 to client applications indicate an active status with likely more communication taking place. Also note that a single client may be configured to support more than one (or even part of one) communication Card Slot (line card) as illustrated with client 2 (330-2) supporting both of Card Slot 2 (322) and Card Slot 3 (323) concurrently. Upper limits on the number of card slots supported by a client may be an implementation decision based on performance characteristics or other factors of the switch and its internal design.

As explained above, multiple client applications may require concurrent access to a configuration database (not shown in FIG. 3) for high-availability switch. The configuration database may be implemented locally on the switch or may be remote to the switch as discussed above. In either case, a client application may interact with the configuration database in accordance with techniques for creating an on demand shadow copy of the database and change request validation service processes as discussed throughout this disclosure.

Figure 4:
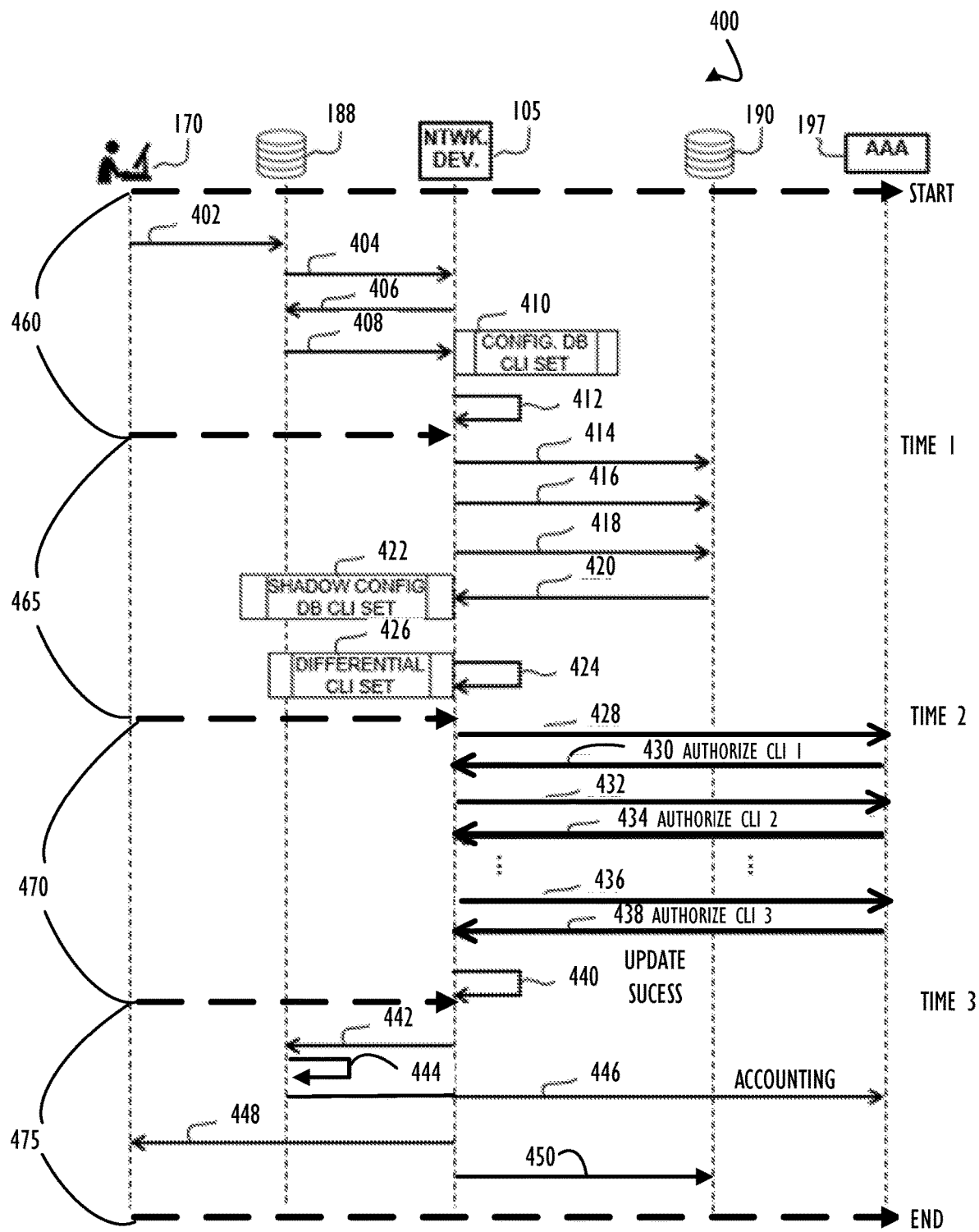
FIG. 4 is a transaction and event timeline illustrating actions that may take place across multiple systems to implement a configuration change in accordance with one or more disclosed implementations.

FIG. 4 illustrates an event timing and transaction diagram 400 showing one possible example of processing a change request object for a network system such as network system 100A-D of FIGS. 1A-D. Some elements from FIGS. 1A-D are represented in FIG. 4, including user 170, active configuration database 188, network device 105 as representing an example network infrastructure device (e.g., 105A-D of FIGS. 1A-D), shadow configuration database 190, and AAA server 197. Note, that as described previously there may not be a separate AAA server 197 and those function may be replaced by locally executing AAA functionality (e.g., AAA processes 186 of FIG. 1D). In either case, the actions of the AAA functionality are represented by the right most element of event timing and transaction diagram 400.

FIG. 4 is divided into four timeline sections. An initial section is represented by a time period from START to time 1 as indicated by section 460. Next, section 465 represents the time period between time 1 and time 2 where functionality to create a CLI differential set relative to an object based change request may be performed. Section 470 represents a third period of time between time 2 and time 3 where authorization of individual CLI commands may be performed (e.g., based on the CLI differential set). Finally, section 475 represents the final period of time in this event diagram that is between time 3 and END where overall status may be determined and reported to a user and the active DB updated (or the shadow CDB may become (and replace) the active CDB).

In FIG. 4, event 402 represents an initial event where a configuration change object based change request (e.g., JSON formatted and via a REST interface) may be transmitted from a user-device (and user 170) that contains a requested configuration modification to be performed on configuration database 188 of network device 105. This configuration modification request is, in this example, provided over a network to network device 105 as an object in JSON format (see arrow 404). For example, via REST agent 180 of FIG. 1C where REST agent 180 implements functions to process the JSON change request object.

Event 406 indicates that locally to network device 105 a request to create a currently running configuration CLI set may be initiated. Event 408 indicates that config DB CLI set 410 may be created to contain a set of CLI commands, that if executed, would create a configuration database equivalent to the currently running DB (e.g., a copy of configuration database 188). Event 412 indicates that, locally to network device 105, the generated CLI set may be validated. At this point we are at time 1 of the overall timeline illustrated in FIG. 4.

Event 414 indicates that the newly created CLI set may be executed to instantiate a shadow configuration database that is initially configured identically to the currently active configuration database. Event 416 indicates that the change request may be applied to the newly instantiated shadow configuration database (e.g., implement change request update on shadow database configuration). Event 418 indicates that a request to create a CLI command set for the updated shadow database configuration may be invoked. Event 420 indicates that shadow config DB CLI set 422 may be created locally on network device 105. Event 424 indicates that the two CLI command sets may be compared (e.g., a difference function performed) to create a CLI differential set that represents a set of CLI commands to alter the currently active database 188 to become the shadow configuration database 190. At this point we are at time 2 of the overall timeline illustrated in FIG. 4.

Events 428 and 430 represent an authorization of a first CLI command (e.g., from differential CLI set 426). Events 430 and 432 represent a second authorization. Authorization may be repeated for each CLI command as indicated by the ellipses to events 436 and 438. Event 440 indicates that authorization is completed for all commands in the differential CLI set 426 and a success status may be determined. At this point we are at time 3 of the overall timeline illustrated in FIG. 4.

Event 442 indicates that the newly added CLIs (already known to be authorized) may be applied to the active configuration DB and a status determined (event 444). Event 446 indicates that accounting for the CLIs applied to the active configuration DB may be performed via communication with AAA 197. Event 448 indicates that a status may be sent to a user via his end-user device. Finally, event 450 indicates that the shadow DB may be disconnected and destroyed (e.g., because it is no longer necessary). In an alternate implementation, a switch over between the shadow DB and the active DB may be performed and then, after the switch, the shadow DB would become the active DB and the previously active DB may be destroyed.

Figure 5:
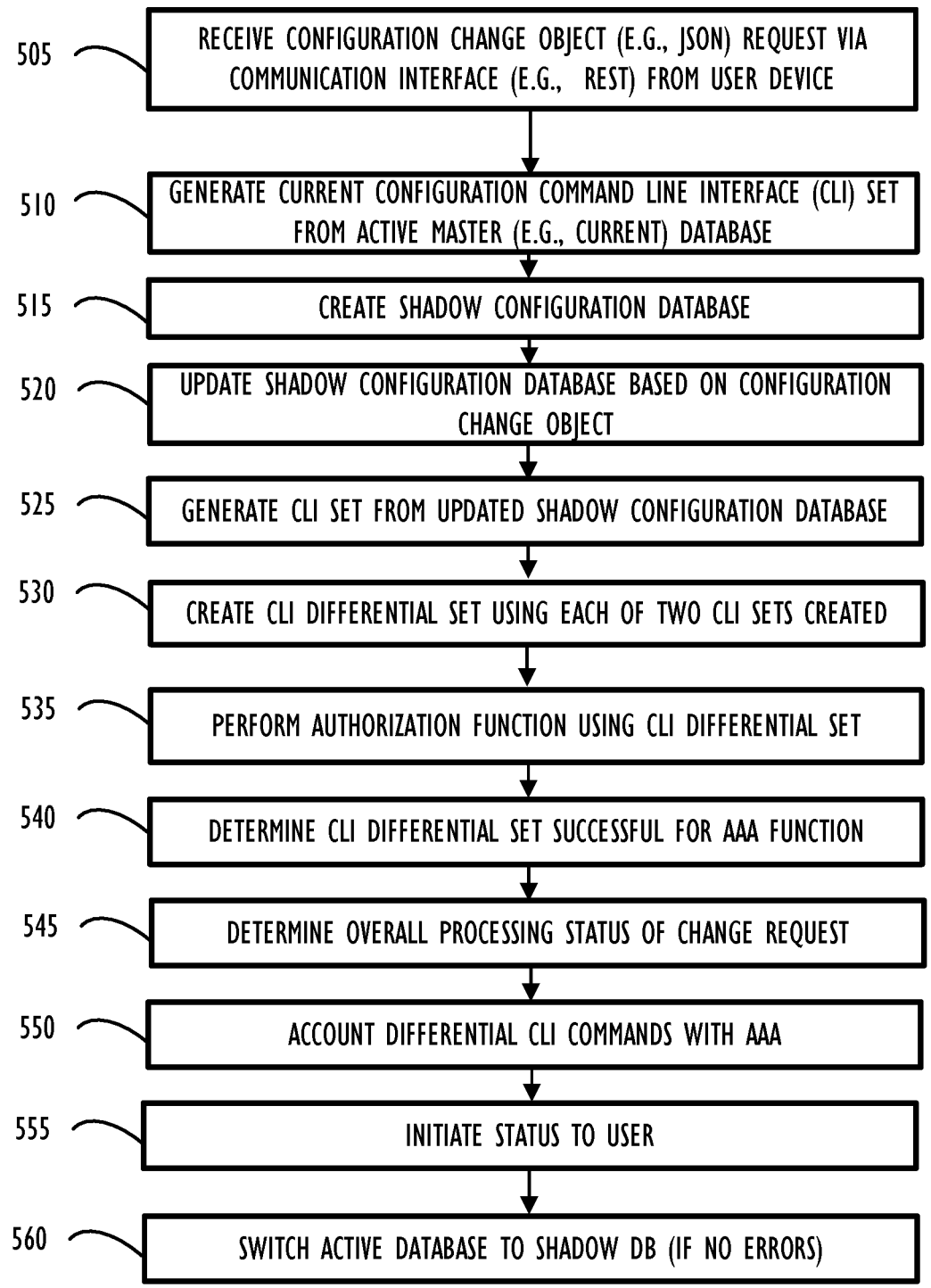
FIG. 5 is a flow chart illustrating a network device (possibly a network infrastructure device or database server) utilizing a shadow copy of the configuration database to implement a configuration change request, according to one or more disclosed implementations.

Referring now to FIG. 5, flow chart 500 illustrates an example of an implementation where a network infrastructure device utilizes a shadow copy of the configuration database to validate and potentially implement a configuration change request. For example, a configuration change request received as a configuration object (e.g., JSON object) via a programming interface (e.g., REST API) from a device associated with the user. Spherically, the change request may be defined with the assistance of a user on a network administration console and then transmitted via a network to a network infrastructure device for processing locally at that network infrastructure device.

Flow chart 500 begins at block 505 where a network infrastructure device may receive a change object (e.g., JSON formatted data object) via a communication interface (e.g., network interface and REST programming interface) that originated at a user device. The user device may be a system administrator console or some other interface device that may enable a web browser (or windows based) user interface for a user. In one example, user 170 may initiate transmission of a JSON-formatted configuration request via a REST interface to a network infrastructure device such as network device 105A-D. Block 510 indicates that, in response to the configuration request, local processing at the network infrastructure device may utilize the configuration object to implement a local configuration change. According to disclosed implementations, the change request may be processed locally at the network interface device by creating a configuration command line interface (CLI) set representative of the currently active master configuration database (CDB). For example, local processing may be performed in part by REST agent 180 of FIG. 1D or other local functional component. Also, in cases where there is a centralized configuration database server (e.g., server 102A of FIG. 1A) processing may occur on the device providing that service.

Continuing with flow chart 500, Block 515 indicates that a shadow CDB may be created. For example, the shadow CDB may be created by executing the CLI set formed at block 510, may be created by forking the database server process, may be created by copying the currently active database, or may be created by other techniques. However, because the CLI command set is readily available (e.g., from block 510) it may be used to perform the shadow CDB creation for most implementations. At this stage there exists an active CDB and a shadow CDB that are equivalent to each other. Block 520 indicates that the shadow CDB may be updated based on information from the configuration change object. For example, to apply the change request received at block 505. At this stage the active CDB and the shadow CDB are no longer equivalent to each other.

Block 525 indicates that a second CLI set may be generated from the updated shadow CDB such that the second CLI represents the updated state (e.g., after processing of the change request) of the CDB. Block 530 indicates that a CLI differential set may be created by comparing the first CLI set to the second CLI set. The CLI differential set may therefore represent another format for information in the configuration change object (i.e., the differential set represents a CLI command set for the delta between the two CDBs). Block 535 indicates that authorization may be performed for each of the commands in the differential CLI set. This authorization may be performed from the network infrastructure device using an already existing authorization infrastructure (e.g., AAA server 197 of FIG. 1D). Block 540 indicates that a success status of the authorization function may be obtained. Block 545 indicates that an overall status for the configuration change object based request may be determined. Block 550 indicates that an accounting function may be performed for each of the command actions in the CLI differential set. Block 555 indicates that a status may be provided to an end-user device, for example, to provide an indication to an end-user. Block 560 indicates that, based on a successful validation, the shadow CDB may become the active CDB on the network infrastructure device and thereby implement the configuration change represented by the configuration change object initially received (e.g., block 505).

Figure 6:
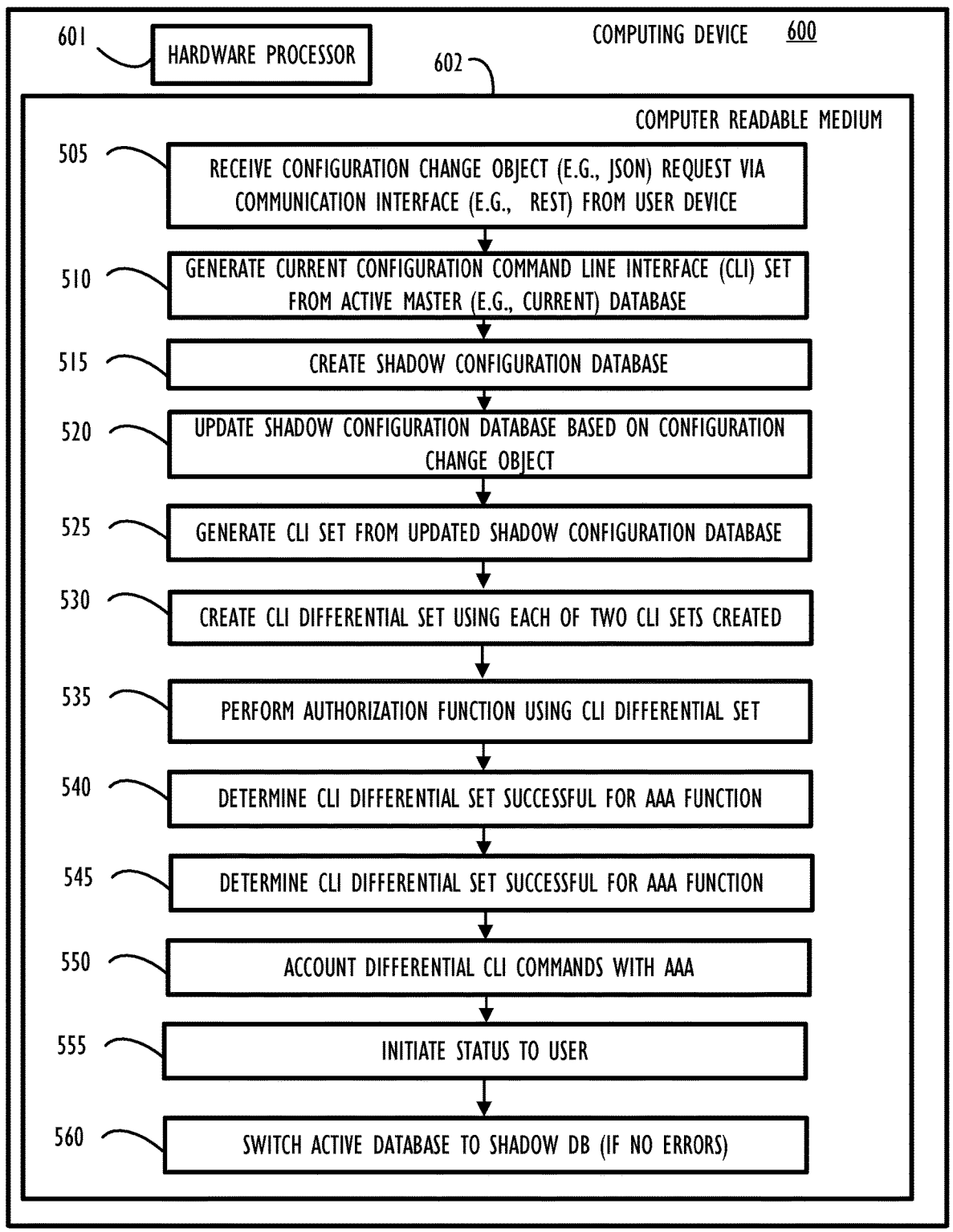
FIG. 6 is an example processor and computer-readable medium to implement an infrastructure device utilizing a shadow copy of the configuration database, according to one or more disclosed embodiments.

FIG. 6 is an example computing device 600, with a hardware processor 601, and accessible machine-readable instructions stored on a machine-readable medium 602 for implementing the creation of a shadow copy of the configuration database to validate and/or implement a configuration change, according to one or more disclosed example implementations. FIG. 6 illustrates computing device 600 configured to perform the flow of method 500 as an example. However, computing device 600 may also be configured to perform the flow of other methods, techniques, functions, or processes described in this disclosure. In this example of FIG. 5, machine-readable storage medium 602 includes instructions to cause hardware processor 601 to perform blocks 505-560 discussed above with reference to FIG. 5.

A machine-readable storage medium, such as 602 of FIG. 6, may include both volatile and nonvolatile, removable and non-removable media, and may be any electronic, magnetic, optical, or other physical storage device that contains or stores executable instructions, data structures, program module, or other data accessible to a processor, for example firmware, erasable programmable read-only memory (EPROM), random access memory (RAM), non-volatile random access memory (NVRAM), optical disk, solid state drive (SSD), flash memory chips, and the like. The machine-readable storage medium may be a non-transitory storage medium, where the term "non-transitory" does not encompass transitory propagating signals.

Figure 7:
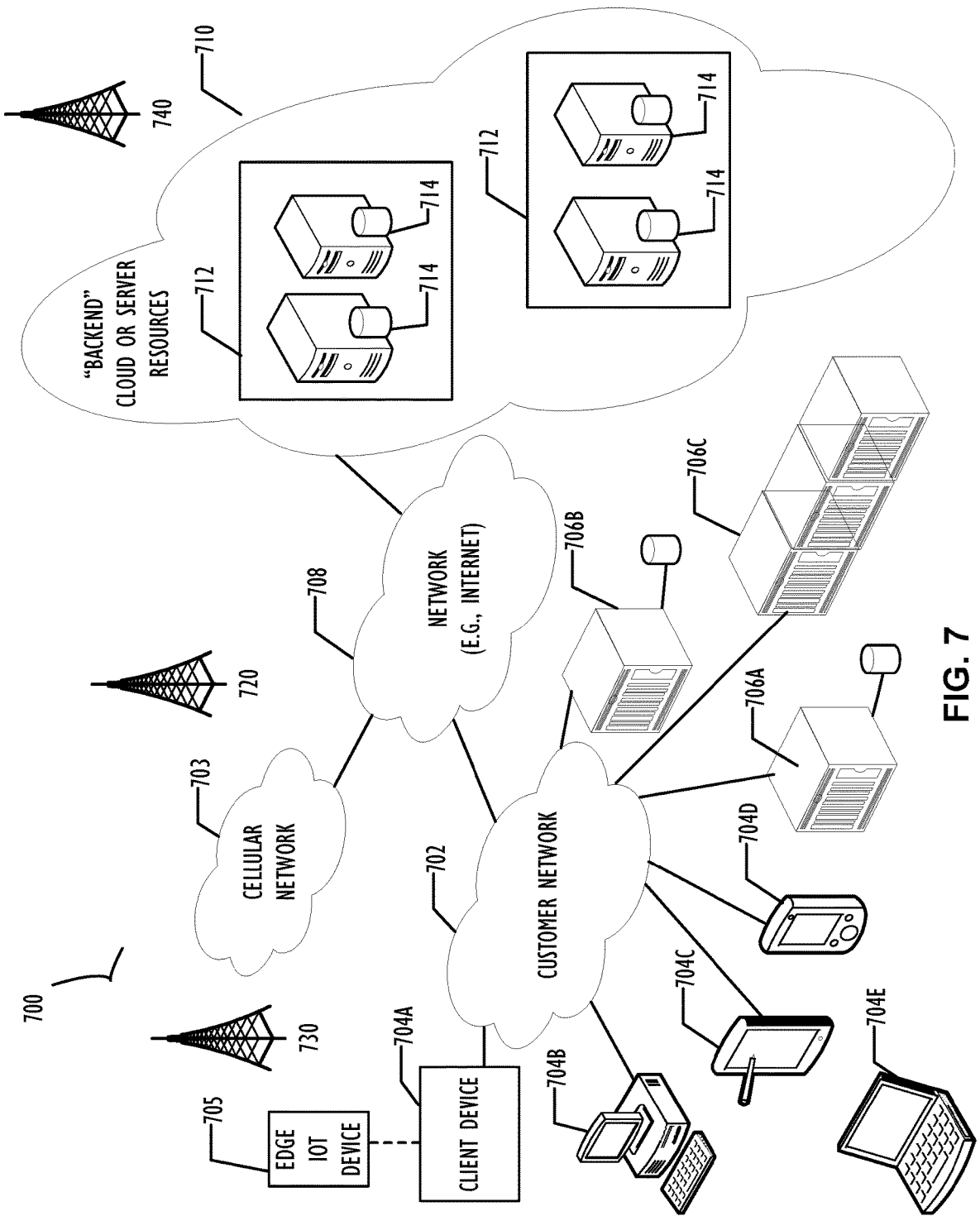
FIG. 7 represents a computer network infrastructure that may be used to implement all or part of the disclosed-technique for utilizing a shadow copy of a configuration database to validate and/or implement a configuration change request, according to one or more disclosed embodiments.
Figure 8:
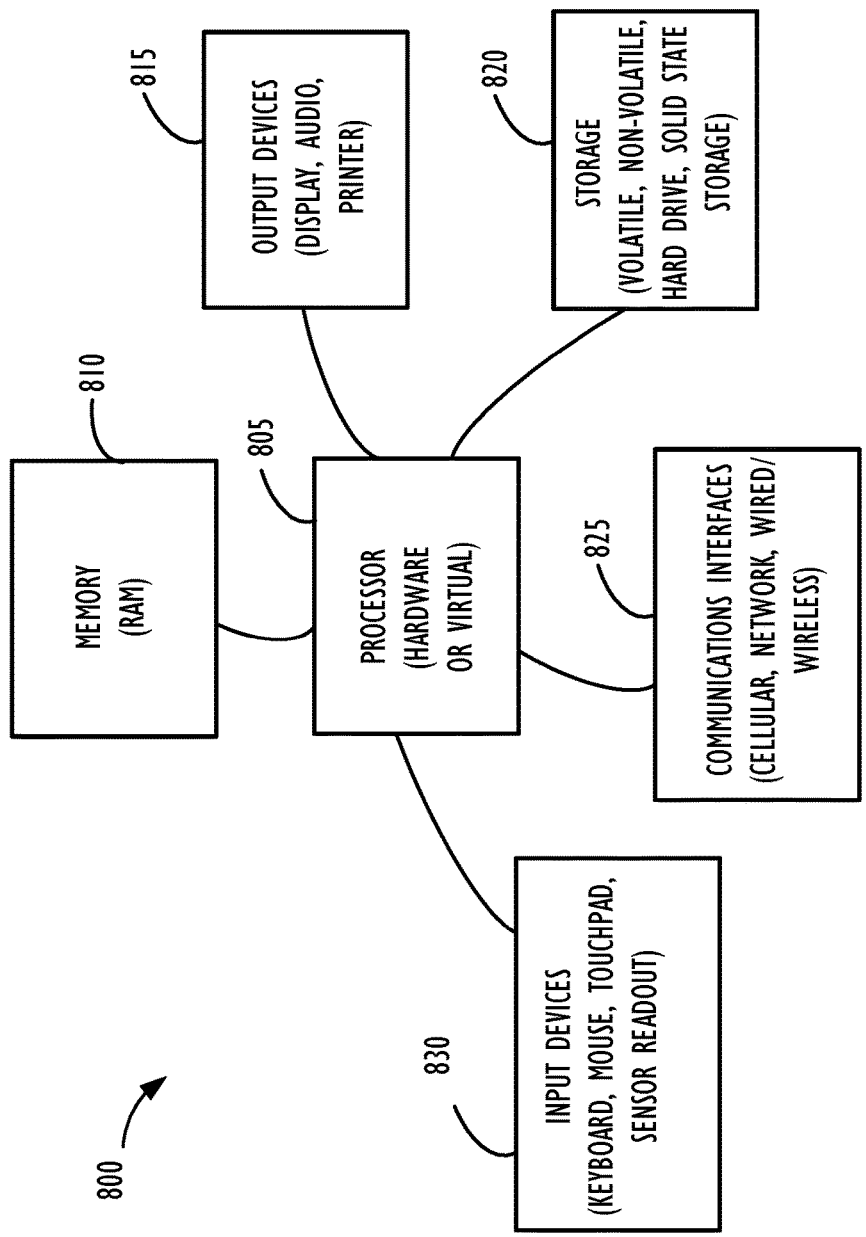
FIG. 8 illustrates a computing device that may be used to implement the functions, modules, processing platforms, execution platforms, communication devices, and other methods and processes of this disclosure.

FIG. 7 represents a computer network infrastructure 700 that may be used to implement all or part of the disclosed technique for utilizing a shadow copy of a configuration database or provide information flow between a system performing the disclosed techniques to validate and/or implement a configuration change using a CLI differential command set and other computer networks, according to one or more disclosed embodiment. Network infrastructure 700 includes a set of networks where embodiments of the present disclosure may operate. Network infrastructure 700 comprises a customer network 702, network 708, cellular network 703, and a cloud service provider network 710. In one embodiment, the customer network 702 may be a local private network, such as local area network (LAN) that includes a variety of network devices that include, but are not limited to switches, servers, and routers.

Each of these networks can contain wired or wireless programmable devices and operate using any number of network protocols (e.g., TCP/IP) and connection technologies (e.g., WiFi® networks, or Bluetooth®. In another embodiment, customer network 702 represents an enterprise network that could include or be communicatively coupled to one or more local area networks (LANs), virtual networks, data centers and/or other remote networks (e.g., 708, 710). In the context of the present disclosure, customer network 702 may include a network device configuration change request processing method such as that described above.

As shown in FIG. 7, customer network 702 may be connected to one or more client devices 704A-E and allow the client devices 704A-E to communicate with each other and/or with cloud service provider network 710, via network 708 (e.g., Internet). Client devices 704A-E may be computing systems such as desktop computer 704B, tablet computer 704C, mobile phone 704D, laptop computer (shown as wireless) 704E, and/or other types of computing systems generically shown as client device 704A.

Network infrastructure 700 may also include other types of devices generally referred to as Internet of Things (IoT) (e.g., edge IOT device 705) that may be configured to send and receive information via a network to access cloud computing services or interact with a remote web browser application (e.g., to receive configuration information).

FIG. 7 also illustrates that customer network 702 includes local compute resources 706A-C that may include a server, access point, router, or other device configured to provide for local computational resources and/or facilitate communication amongst networks and devices. For example, local compute resources 706A-C may be one or more physical local hardware devices. Local compute resources 706A-C may also facilitate communication between other external applications, data sources (e.g., 707A and 707B), and services, and customer network 702.

Network infrastructure 700 also includes cellular network 703 for use with mobile communication devices. Mobile cellular networks support mobile phones and many other types of mobile devices such as laptops etc. Mobile devices in network infrastructure 700 are illustrated as mobile phone 704D, laptop computer 704E, and tablet computer 704C. A mobile device such as mobile phone 704D may interact with one or more mobile provider networks as the mobile device moves, typically interacting with a plurality of mobile network towers 720, 730, and 740 for connecting to the cellular network 703.

FIG. 7 illustrates that customer network 702 is coupled to a network 708. Network 708 may include one or more computing networks available today, such as other LANs, wide area networks (WAN), the Internet, and/or other remote networks, in order to transfer data between client devices 704A-D and cloud service provider network 710. Each of the computing networks within network 708 may contain wired and/or wireless programmable devices that operate in the electrical and/or optical domain.

In FIG. 7, cloud service provider network 710 is illustrated as a remote network (e.g., a cloud network) that is able to communicate with client devices 704A-E via customer network 702 and network 708. The cloud service provider network 710 acts as a platform that provides additional computing resources to the client devices 704A-E and/or customer network 702. In one embodiment, cloud service provider network 710 includes one or more data centers 712 with one or more server instances 714. Cloud service provider network 710 may also include one or more frames representing a scalable compute resource that may perform processing for at least a portion of the techniques of this disclosure.

FIG. 8 illustrates a computing device 800 that may be used to implement the functions, modules, processing platforms, execution platforms, communication devices, and other methods and processes of this disclosure. For example, computing device 800 illustrated in FIG. 8 could represent a client device or a physical server device and include either hardware or virtual processor(s) depending on the level of abstraction of the computing device. In some instances (without abstraction), computing device 800 and its elements, as shown in FIG. 8, each relate to physical hardware. Alternatively, in some instances one, more, or all of the elements could be implemented using emulators or virtual machines as levels of abstraction. In any case, no matter how many levels of abstraction away from the physical hardware, computing device 800 at its lowest level may be implemented on physical hardware.

As also shown in FIG. 8, computing device 800 may include one or more input devices 830, such as a keyboard, mouse, touchpad, or sensor readout (e.g., biometric scanner) and one or more output devices 815, such as displays, speakers for audio, or printers. Some devices may be configured as input/output devices also (e.g., a network interface or touchscreen display).

Computing device 800 may also include communications interfaces 825, such as a network communication unit that could include a wired communication component and/or a wireless communications component, which may be communicatively coupled to processor 805. The network communication unit may utilize any of a variety of proprietary or standardized network protocols, such as Ethernet, TCP/IP, to name a few of many protocols, to effect communications between devices. Network communication units may also comprise one or more transceiver(s) that utilize the Ethernet, power line communication (PLC), WiFi, cellular, and/or other communication methods.

As illustrated in FIG. 8, computing device 800 includes a processing element such as processor 805 that contains one or more hardware processors, where each hardware processor may have a single or multiple processor cores. In one embodiment, the processor 805 may include at least one shared cache that stores data (e.g., computing instructions) that are utilized by one or more other components of processor 805. For example, the shared cache may be a locally cached data stored in a memory for faster access by components of the processing elements that make up processor 805. In one or more embodiments, the shared cache may include one or more mid-level caches, such as level 2 (L2), level 3 (L3), level 4 (L4), or other levels of cache, a last level cache (LLC), or combinations thereof. Examples of processors include but are not limited to a central processing unit (CPU) a microprocessor. Although not illustrated in FIG. 8, the processing elements that make up processor 805 may also include one or more of other types of hardware processing components, such as graphics processing units (GPU), application specific integrated circuits (ASICs), field-programmable gate arrays (FPGAs), and/or digital signal processors (DSPs).

FIG. 8 illustrates that memory 810 may be operatively and communicatively coupled to processor 805. Memory 810 may be a non-transitory medium configured to store various types of data. For example, memory 810 may include one or more storage devices 820 that comprise a non-volatile storage device and/or volatile memory. Volatile memory, such as random-access memory (RAM), can be any suitable non-permanent storage device. The non-volatile storage devices 820 can include one or more disk drives, optical drives, solid-state drives (SSDs), tap drives, flash memory, read only memory (ROM), and/or any other type of memory designed to maintain data for a duration of time after a power loss or shut down operation. In certain instances, the non-volatile storage devices 820 may be used to store overflow data if allocated RAM is not large enough to hold all working data. The non-volatile storage devices 820 may also be used to store programs that are loaded into the RAM when such programs are selected for execution.

Persons of ordinary skill in the art are aware that software programs may be developed, encoded, and compiled in a variety of computing languages for a variety of software platforms and/or operating systems and subsequently loaded and executed by processor 805. In one embodiment, the compiling process of the software program may transform program code written in a programming language to another computer language such that the processor 805 is able to execute the programming code. For example, the compiling process of the software program may generate an executable program that provides encoded instructions (e.g., machine code instructions) for processor 805 to accomplish specific, non-generic, particular computing functions.

After the compiling process, the encoded instructions may then be loaded as computer executable instructions or process steps to processor 805 from storage device 820, from memory 810, and/or embedded within processor 805 (e.g., via a cache or on-board ROM). Processor 805 may be configured to execute the stored instructions or process steps in order to perform instructions or process steps to transform the computing device into a non-generic, particular, specially programmed machine or apparatus. Stored data, e.g., data stored by a storage device 820, may be accessed by processor 805 during the execution of computer executable instructions or process steps to instruct one or more components within the computing device 800.

A user interface (e.g., output devices 815 and input devices 830) can include a display, positional input device (such as a mouse, touchpad, touchscreen, or the like), keyboard, or other forms of user input and output devices. The user interface components may be communicatively coupled to processor 805. When the output device is or includes a display, the display can be implemented in various ways, including by a liquid crystal display (LCD) or a cathode-ray tube (CRT) or light emitting diode (LED) display, such as an organic light emitting diode (OLED) display. Persons of ordinary skill in the art are aware that the computing device 800 may comprise other components well known in the art, such as sensors, powers sources, and/or analog-to-digital converters, not explicitly shown in FIG. 8.

Certain terms have been used throughout this description and claims to refer to particular system components. As one skilled in the art will appreciate, different parties may refer to a component by different names. This document does not intend to distinguish between components that differ in name but not function. In this disclosure and claims, the terms "including" and "comprising" are used in an open-ended fashion, and thus should be interpreted to mean "including, but not limited to . . . ." Also, the term "couple" or "couples" is intended to mean either an indirect or direct wired or wireless connection. Thus, if a first device couples to a second device, that connection may be through a direct connection or through an indirect connection via other devices and connections. The recitation "based on" is intended to mean "based at least in part on." Therefore, if X is based on Y, X may be a function of Y and any number of other factors.

The above discussion is meant to be illustrative of the principles and various implementations of the present disclosure. Numerous variations and modifications will become apparent to those skilled in the art once the above disclosure is fully appreciated. It is intended that the following claims be interpreted to embrace all such variations and modifications.

What is claimed is:

1. A method of operating a network device, comprising:
providing a current configuration database for the network device;
receiving a configuration change JavaScript Object Notation (JSON)-formatted object-based change request from a user; and
in response to receiving the configuration change JSON-formatted object-based change request:
generating a current configuration command line interface (CLI) set from the current configuration database, the current configuration CLI set comprising a first set of CLI commands;
creating a shadow configuration database for the network device by executing the current configuration CLI set generated in response to receiving the configuration change JSON-formatted object-based change request, the shadow configuration database initially being a copy of the current configuration database;

updating the shadow configuration database in accordance with the received configuration change JSON-formatted object-based change request;
generating an updated configuration CLI set from the updated shadow configuration database, the updated configuration CLI set comprising a second set of CLI commands;
generating a differential CLI set comprising the difference between the first set of CLI commands and the second set of CLI commands generated based on the configuration change JSON-formatted object-based change request;
verifying that the user is authorized to execute the CLI commands in the generated differential CLI set by forwarding the CLI commands of the generated differential set to an authorization server; and
in response to successfully verifying that the user is authorized to execute the CLI commands in the generated differential CLI set, replacing the current configuration database with the updated shadow configuration database.

2. The method of claim 1, wherein verifying that the user is authorized to execute the CLI commands in the differential CLI set comprises submitting the CLI commands of the differential CLI set to an authorization resource.

3. The method of claim 1, wherein the network device comprises a network switch.

4. The method of claim 1, wherein the configuration change JSON-formatted object-based change request is received via a Representational State Transfer interface.

5. The method of claim 1, further comprising:
accounting for the configuration change JSON-formatted object-based change request to provide audit controls relative to processing of change requests by users.

6. A network device, comprising:
a processor for executing functional code;
a data and programming memory coupled to the processor, the data and programming memory storing a current configuration database corresponding to a current configuration of the network device;
the network device having a user interface to receive a configuration change JSON-formatted object-based change request from the user; and
the functional code including at least one sequence of instructions executed by the processor in response to the configuration change JSON-formatted object-based changed request to:
generate a current configuration CLI set from the current configuration database, the current configuration CLI set comprising a first set of CLI commands;
create a shadow configuration database for the network device by executing the current configuration CLI set generated in response to receiving the configuration change JSON-formatted object-based change request, the shadow configuration database, the shadow configuration database initially being a copy of the current configuration database;
update the shadow configuration database in accordance with the received configuration change JSON-formatted object-based change request;
generate an updated configuration CLI set from the updated shadow configuration database, the updated configuration CLI set comprising a second set of CLI commands;
generate a differential CLI set comprising the difference between the first set of CLI commands and the second set of CLI commands generated based on the configuration change JSON-formatted object-based change request;
verify that the user is authorized to execute the CLI commands in the generated differential CLI set by forwarding the CLI commands of the generated differential set to an authorization server; and
in response to successfully verifying that the user is authorized to execute the CLI commands in the generated differential CLI set, replace the current configuration database with the updated shadow configuration database.

7. The network device of claim 6, wherein the processor verifies that the user is authorized to execute the CLI commands in the differential CLI set by submitting the CLI commands of the differential CLI set to an authorization resource.

8. The network device of claim 7, wherein the authorization resource comprises an authorization server coupled to the network device.

9. The network device of claim 6, wherein the network device comprises a network switch.

10. The network device of claim 6, wherein the configuration change JSON-formatted object-based change request is received via a Representational State Transfer interface.

11. The network device of claim 6, wherein an accounting resource provides audit controls relative to processing of change requests by users.

12. A non-transitory computer-readable medium comprising computer-executable instructions stored thereon that when executed by at least one processor causes the at least one processor to:
generate a current configuration CLI set from a current configuration database for a network device, the current configuration CLI set comprising a first set of CLI commands;
create a shadow configuration database for the network device by executing the current configuration CLI set generated in response to receiving a configuration change JSON-formatted object-based change request, the shadow configuration database initially being a copy of the current configuration database;
update the shadow configuration database in accordance with the received configuration change JSON-formatted object-based change request;
generate an updated configuration CLI set from the updated shadow configuration database, the updated configuration CLI set comprising a second set of CLI commands;
generate a differential CLI set comprising the difference between the first set of CLI commands and the second set of CLI commands which is generated based on the configuration change JSON-formatted object-based change request;
verify that the user is authorized to execute the CLI commands in the generated differential CLI set by forwarding the CLI commands of the generated differential set to an authorization server; and
in response to successfully verifying that the user is authorized to execute the CLI commands in the differential CLI set, replace the current configuration database with the updated shadow configuration database.

13. The non-transitory computer-readable medium of claim 12, wherein verifying that the user is authorized to execute the CLI commands in the differential CLI set comprises submitting the CLI commands of the differential CLI set to an authorization resource.

14. The non-transitory computer-readable medium of claim 12, wherein the network device comprises a network switch.

15. The non-transitory computer-readable medium of claim 12, wherein the configuration change JSON-formatted object-based change request is received via a Representational State Transfer interface.

16. The non-transitory computer-readable medium of claim 12, further comprising:
   accounting for the configuration change JSON-formatted object-based change request via an accounting resource to provide audit controls relative to processing of change requests by users.

* * * * *